United States Patent
Demark

[15] 3,654,545
[45] Apr. 4, 1972

[54] SEMICONDUCTOR STRAIN GAUGE AMPLIFIER

[72] Inventor: Anthony M. Demark, Philadelphia, Pa.
[73] Assignee: Honeywell Inc., Minneapolis, Minn.
[22] Filed: Aug. 11, 1970
[21] Appl. No.: 62,868

[52] U.S. Cl............323/75 B, 323/75 E, 323/75 N, 324/65 TC
[51] Int. Cl..............................G01r 17/12
[58] Field of Search.............323/75 B, 75 E, 75 N; 324/62 B, 65 TC

[56] References Cited

UNITED STATES PATENTS

| | | |
|---|---|---|
| 3,495,159 | 2/1970 | Smith....................323/75 E |
| 3,182,252 | 5/1965 | Berg......................324/65 TC |
| 3,305,734 | 2/1967 | Buttenhoff..............324/65 TC |
| 3,457,493 | 7/1969 | Shoemaker et al.......323/75 E |
| 3,503,261 | 3/1970 | Riester et al............323/75 N |
| 3,517,556 | 6/1970 | Barker...................323/75 N |

*Primary Examiner*—A. D. Pellinen
*Attorney*—Arthur H. Swanson and Lockwood D. Burton

[57] ABSTRACT

A semiconductor strain gauge amplifier apparatus having a temperature compensated bridge circuit for neutralizing the adverse affect of the ambient temperature variations upon the initial offset, sensitivity and span of the bridge, and thereby, providing temperature compensation over a wide range of operating temperatures.

7 Claims, 2 Drawing Figures

FIG. I

INVENTOR.
ANTHONY M. DEMARK
BY Lockwood D. Burton
ATTORNEY.

INVENTOR.
ANTHONY M. DEMARK
BY
Lockwood D Burton
ATTORNEY.

SEMICONDUCTOR STRAIN GAUGE AMPLIFIER

The present invention relates to electrical apparatus, and more particularly, to a transducer-transmitter in conjunction with a semiconductor strain gauge in an impedance bridge.

A chronic problem with the use of an impedance bridge, as a measuring means, is the adverse effect of ambient temperature variations upon the initial offset, sensitivity and span of the bridge. The initial offset is the voltage appearing across the output terminals of an impedance bridge for zero unbalance. The sensitivity is the change in output voltage for a change in an input impedance change parameter. The span is the range between the electrical input parameter limits of the impedance bridge. Initially balanced impedance bridges become unbalanced because their individual bridge elements change impedance unpredictably, uniformly and nonuniformly as a result of ambient temperature changes. This problem is critical in applications using highly sensitive impedance bridges to measure physical conditions of small magnitudes, such as the output signal of semiconductor strain gauge elements.

In the art of industrial process control, measurements are made of various conditions in the process under control. Often, the signal produced by a condition sensor is a voltage signal in the magnitude of millivolts. One such sensor, frequently used in such control systems, is a strain gauge.

The most common types of resistance strain gauges in use are the resistance wire or foil strain gauge, and the semiconductor strain gauge. The resistance wire of foil strain gauge has certain advantages. For example, the resistance wire or foil elements can be constructed of a material which is relatively stable with changes in temperature. In addition, the resistance wire or foil elements may be matched fairly easily so that a pair of such resistance wire or foil elements may be used to provide for temperature compensation within a resistance bridge.

The resistance wire or foil gauge also has certain disadvantages. Generally, the resistance wire or foil gauges have a relatively low sensitivity to strain. That is, the change in the resistance is relatively low with the changes of strain. Therefore, the resistance wire strain gauges generally have a low gauge factor.

Semiconductor strain gauges, on the other hand, have certain advantages. The semiconductor strain gauge has a relatively high sensitivity to strain and therefore has a high gauge factor. However, the semiconductor strain gauge elements are temperature sensitive. Also it is difficult to provide for matched pairs of semiconductor strain gauge elements whereby temperature compensation can be achieved by matching pairs in the resistance bridge.

Therefore, in order to be able to utilize the high gauge factor of the semiconductor strain gauge, elaborate circuitry was heretofore necessarily incorporated into any resistance bridge employing the semiconductor strain gauge elements. The millivolt output signal of an impedance bridge can be seldom be used directly in a control system. The signal must be amplified, and frequently converted to a current signal of predetermined range before it can be used effectively in a control system. Heretofore, it has been necessary to provide a strain gauge or other sensor with a specially designed pair of compensated leads to conduct a sense signal from the sensor, at the process location, to a remotely located signal transducer-receiver. These long coupling leads are expensive and have long presented complications in the system which, for lack of a reasonable alternative, have been tolerated. Further, the transducer-transmitter unit, known as a millivolt to current transducer, has required either a local power supply or a separate pair of leads to supply power to the transducer from a remote source. When prior art bridges are used over extended temperature ranges, the temperature response characteristics of the elements cause the resultant output signals to become very unreliable. The initial offset, or zero, and the output span voltages of the bridge respond to the unwanted temperature input with same temperature coefficient as the elements of the bridge. Various means, such as diodes with inverse temperature characteristics, temperature compensated semiconductor output amplifiers and thermistors included in one arm of the bridge, have been utilized previously, in attempts to compensate for these large changes in the zero set and span readings as a function of the temperature. However, these methods have only limited capabilities and then only over rather small temperature ranges.

If it were practicable to exactly match the strain gauge elements in a bridge, it would be possible to provide for perfect temperature compensation through the use of matched pairs of elements. Unfortunately, it is at best very difficult to obtain such perfect matching of semiconductor strain gauge elements. Resistance bridges currently in use produce errors in the output signal due to temperature changes. These errors in the output signals generally are of two types. The first type of error is a change in the zero point, or initial offset voltage which is the value of the output signal with no strain as the temperature is changed. For example, the value of the output signal with no strain applied might increase or decrease as the temperature increases. The second type of error is a change in the sensitivity and span of the bridge or the strain gauges as the temperature is changed. For example, the strain gauge might produce a different resistance change for a given change in strain over a range of temperatures. The sensitivity of the bridge may also change in response to temperature changes either as an increase or a decrease, depending upon the particular temperature sensitivity characteristic of the individual strain gauge elements.

It is accordingly, an object of the present invention to provide an improved transducer-transmitter which obviates the foregoing deficiencies of the prior art apparatus.

It is another object of the present invention to provide an improved transducer-transmitter as set forth which derives its energy power from the remote station to which the signal is transmitted yet requires only a two wire transmission line for transmission of both the signal and the energizing power.

It is still another object of the present invention to provide an improved transducer-transmitter, which includes temperature compensation.

It is yet another object of the present invention to provide a temperature compensation circuit for neutralizing the adverse effect of the ambient temperature variations upon the performance of an impedance bridge.

It is a further object of the present invention to provide temperature compensation of the initial bridge offset or zero point voltage.

It is a still further object of the present invention to provide span compensation and sensitivity stabilization.

Still another object of the present invention is to provide span and sensitivity recompensation.

In accomplishing these and other objects these has been provided, in accordance with the present invention, a solid state transducer-transmitter which is sufficiently small that it may be built into a part of the sensor housing, thereby taking advantage of the small size of integrated or partially integrated circuit techniques. The transducer-transmitter is provided with a novel impedance bridge with one split input node which results in what may be called an open bridge. In the present invention the bridge has a configuration with two input nodes or terminals and two output nodes or terminals; one of the input, or power nodes, to the bridge, is split into two nodes or terminals. Each of these two power or input nodes is fed by a constant or controlled current source. The drift in the initial bridge offset, or zero voltage with increasing temperature is alleviated by the use of the constant current impedance bridge with one split input node and push-pull self-balancing input circuitry.

The span compensation and sensitivity variations resulting from the semiconductor characteristics of the strain gauges are made substantially constant notwithstanding temperature changes, by adding shunting resistors and thermistor circuits in the input and output node circuitry.

A better understanding of the present invention may be had from the following detailed description when read in connection with the accompanying drawings in which.

Figure 1:
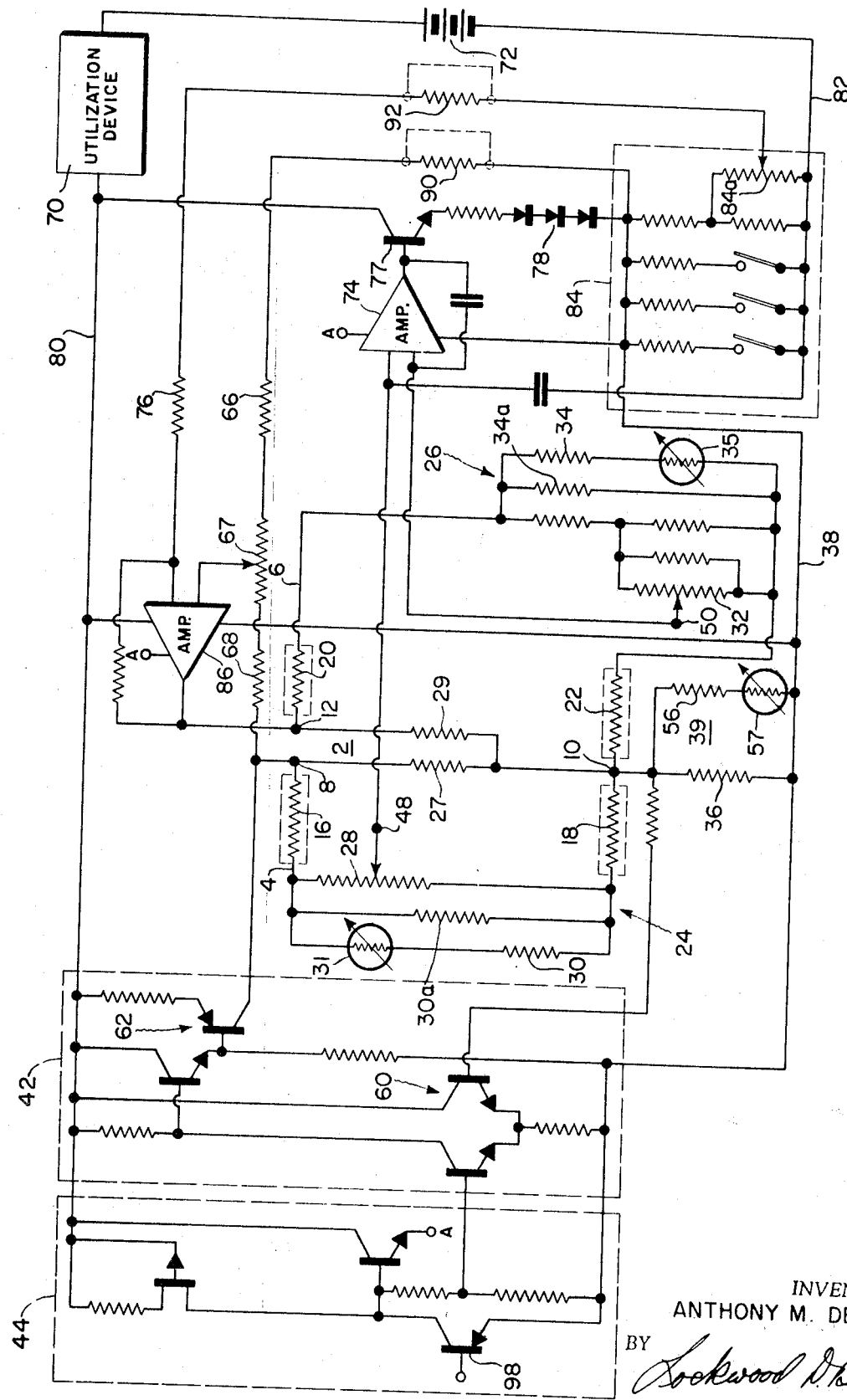
FIG. 1 is a simplified block and schematic diagram of an impedance bridge and transmitter-receiver apparatus constructed in accordance with the present invention.

Referring now to the drawings in more detail, there is shown in Fig. 1 a diagram of the system which embodies the present invention. There, a primary sensor is represented by an impedance bridge 2 which includes two legs 4 and 6. The leg 4 is connected between an input node 8 and another or common input node 10. The leg 6 is connected between an input node 12 and the common input node 10. The leg 4 includes two semiconductor sensing elements 16 and 18 as series elements. Similarly, the leg 6 includes semiconductor sensing elements 20 and 22 as series elements. Connected between the semiconductor sensing elements 16 and 18 is a temperature compensating and initial zero set means 24 completing the series circuit of the leg 4. Symmetrically, a temperature compensating and initial zero means 26 is connected in series with the semiconductor sensing elements 20 and 22 completing the series circuit of the leg 6. A resistor 27 is also connected between the input node 8 and the common input node 10 forming a shunt across the leg 4. Symmetrically a resistor 29 is connected between the input node 12 and the common input node 10 forming a shunt across the leg 6. A slidewire 28 forms the initial zero set means for the leg 4. A slidewire 32 provides initial zero set means in the leg 6. A resistor 36 which senses the sum of the currents flowing through the legs 4 and 6 is connected between the input note 10 and a common point 38.

As the sensing elements of the bridge 2 are strained, the ratio between the resistances of the sensing elements 16 and 18 and the sensing elements 20 and 22 changes. Thereby the output voltage across the output nodes 48 and 50 changes from its initial set value of zero.

The currents flowing through the legs 4 and 6 are summed at the input node 10 and flow through a temperature compensating means 39 of which the resistor 36 is a part. A voltage drop signal appears across the temperature compensating and current sensing means 39 which signal is proportional to the sum of the currents flowing through the legs 4 and 6. A current source feedback and summing means 42 is connected to the output node 10 and senses the voltage drop signal across the temperature compensating and sensing means 39. That signal is compared with a reference voltage signal from a reference voltage source 44. The two aforementioned voltages are summed and compared within the current source feedback and summing means 42. If the voltage signal at node 10 with respect to the ground or common point 38, deviates from a predetermined value, the current source feedback and summing means 42 adjusts the current flowing in the leg 4 of the bridge 2, thereby assuring that the sum of the currents flowing in the legs 4 and 6 is held at a predetermined value. In addition, a second feedback means regulates the flow of current in each of the legs 4 and 6.

The voltage signal across the output nodes 48 and 50 is fed into a differential amplifier system 74. The output of the amplifier 74 is applied as input signal to the base electrode of an output transistor 77. The collector of the transistor 77 is connected to the positive power supply line 80. The emitter of the transistor 77 is connected, through a resistor and a series string of diodes (three being shown) to an adjustable resistance network 84. The other side of the resistance network 84 is connected to the negative power supply lead 82. Included in the resistance network 84 is a slidewire resistor 84A, the slider of which is connected, through a resistor 92 and, through a resistor 76 to one input terminal of a feedback differential amplifier 86. The junction between the diodes 78 and the resistance network 84 is connected, through a resistor 90, a resistor 66, a slidewire resistor 67, and a resistor 68, all serially connected, to the terminal 8 of the measuring bridge 2. The slider of the slidewire resistor 67 is connected to the other input of the amplifier 86. The polarity of the connections of the output of the differential amplifier 74 and the feedback connection through the amplifier 86 adjusts the relative currents in the legs 4 and 6 such that an increase in current in one leg is compensated for by an equal and opposite decrease in the other leg. Therefore, if the bridge 2 is strained such that a voltage signal appears across the output nodes 48 and 50, the feedback amplifier system reduces this imbalance to a value approaching zero. The two aforementioned current feedback systems keep the bridge 2 in electrical equilibrium at all times.

The temperature compensating means 39 comprised of a resistor 36 in parallel with a series combination of a resistor 56 and a thermistor 57, and connected between the output node 10 of the bridge 2 and the common point 38. The sensitivity, that is, the ratio of the change in output voltage signal to an incremental change in strain of the bridge 2 decreases as the ambient temperature increases. Therefore, if the ambient temperature changes resulting in a change in the sensitivity of the bridge, the total currents flowing through the legs 4 and 6 must increase in order to compensate for the decrease in sensitivity of the bridge 2 due to the characteristics of the semiconductor sensing elements 16, 18, 20 and 22. That is, since the voltage output signal is a product of the resistance times the current, and since the semiconductor sensing elements 16, 18, 20 and 22 exhibit a smaller change in resistance for a predetermined change in strain, the sum of the currents flowing through the legs 4 and 6 must be increased. In order to effectuate the increase in current flowing through the legs 4 and 6, a temperature compensating means 39 is connected between output node 10 and the common point 38. The series combination of the thermistor 57 and the resistor 56 reduces the resistance between the input node 10 and the common point 38 as the ambient temperature increases. Therefore, in order to maintain the same voltage signal with increasing ambient temperature across the temperature compensating means 39, the current flow through the bridge 2 must increase. The voltage signal at the common node 10 is compared with the voltage signal of the reference voltage source 44 by a differential amplifier 60, a part of the feedback and summing means 42. If any difference between the signals is detected, the current feedback and summing means 42 adjusts the current flowing through the bridge 2 by means of the current control amplifier 62 thereby increasing the voltage signal at the input node 10 with respect to the common point 38. With decreasing ambient temperature the opposite phenomenon takes place.

The resistor 27 is connected between the input node 8 and the common input node 10, thereby shunting the leg 4 on the bridge 2. Similarly, the resistor 29 shunts the leg 6. The temperature compensating means 39, having a thermistor 57, exhibits a very nonlinear or logarithmic, characteristic of resistance with temperature change and thereby tends to overcompensate for the decrease in sensitivity of the bridge 2 with increasing ambient temperature. The resistors 27 and 29 are fixed and provide a linearizing influence on the compensation by the temperature compensating means 39.

An output node temperature compensating means is connected in parallel with the slidewire 28 in the leg 4 and included a thermistor 31 serially connected with a resistor 30, the serial pair being shunted by a resistor 30a. Similarly, an output node compensating means is connected across the slidewire 32 in the leg 6 and includes a thermistor 35 serially connected with a resistor 34 the serial pair being shunted by a resistor 34a. The output node temperature compensating means increase in resistance as the ambient temperature decreases thereby causing an increase in the flow of current in the slidewire resistors 28 and 32, respectively. The increase in the current flowing through the slidewire 28 compensates for the tendency of overcompensation in the action of the temperature compensating means 39 and the resistor 27. The operation with respect to the slidewire 32 and the resistor 29 work in conjunction with the temperature compensating means 39 in an identical manner. By the proper choice of values of the parameters of the three above mentioned temperature compensating means the variations in the response of the bridge 2 can be reduced to very small quantities.

As shown in Fig. 1 connected to the output nodes 48 and 50 of the bridge 2, a differential amplifier 74 and a common mode amplifier 86. The amplifier 74 has an output connected to an emitter follower transistor circuit. A series of the forward bias diodes 78 connected in the emitter circuit of the transistor circuit raises the cut off point of the transistor 77 to a value well above ground. The aforementioned type of circuitry is utilized to provide a reference voltage level which is above zero whereby the system may be operated with the leads 80 and 82 providing monopolar power only.

The emitter signal of the transistor circuit is fed into a resistor network 84 to add to the voltage signal across the resistor bank 84 which is proportional to the sum of all of the currents flowing in the power leads 80, 82. The output of the common mode amplifier 86 is connected to the input node 12 to provide a feedback to the leg 6. The current from the transistor 77 is summed with the constant current from the remainder of the circuitry resulting in an output current flowing through the leads 80 and 82 which varies as a measure of the changes in the strain on the bridge 2. The portion of the output current which is proportional to the strain on the bridge 2 is measured at a remote location by the current sensing means or utilization device 70. The utilization device 70 is serially connected with a power source representative by a battery 72.

The inputs of the feedback amplifier 86 are connected across the resistance bank 84. The output signals of the common mode amplifier 86 changes the current in one leg in one direction and through the feedback circuit changes the current in the other leg of the bridge 2 in the opposite direction.

Figure 2:
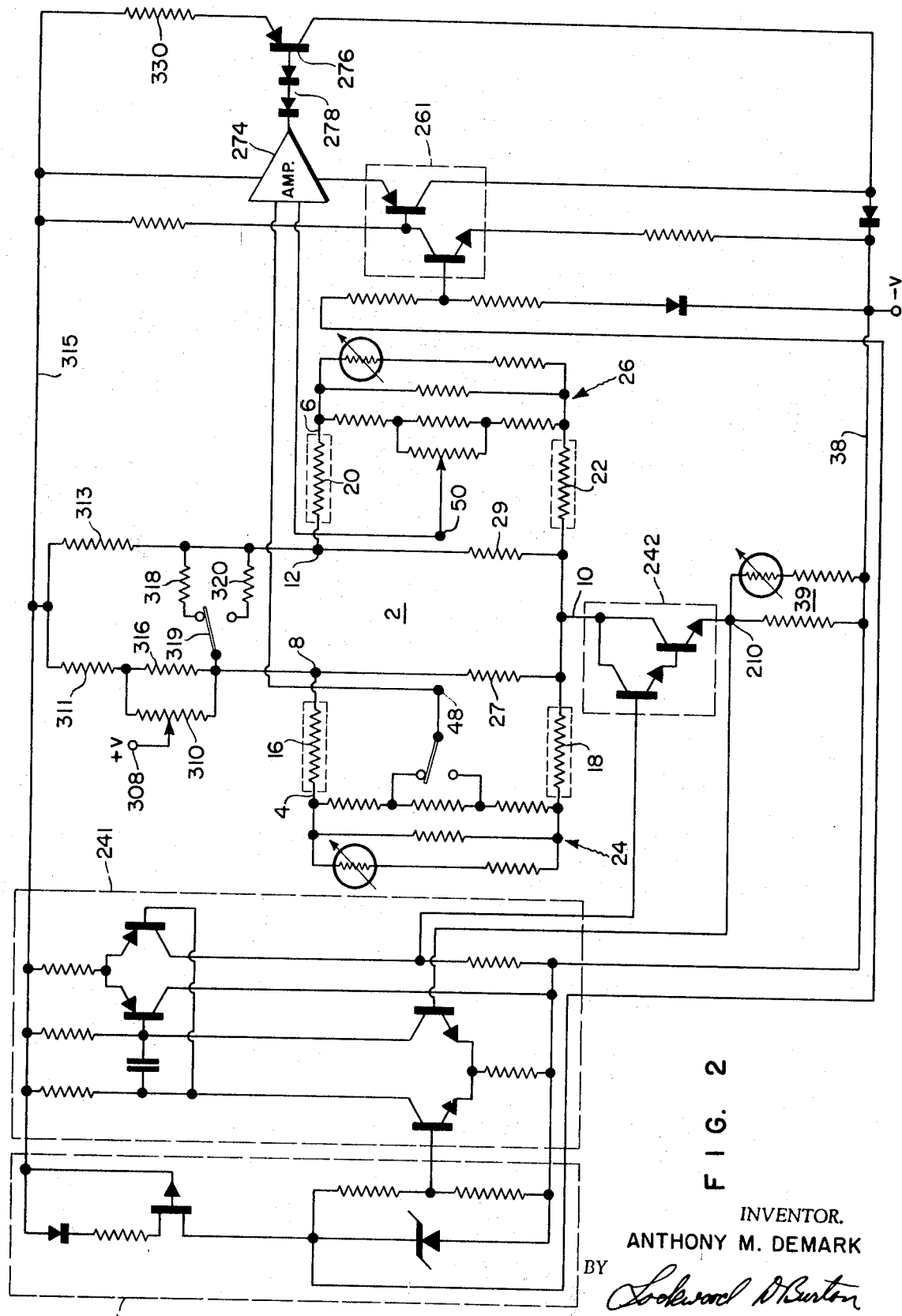
FIG. 2 is a simplified block and schematic diagram of another impedance bridge also embodying the present invention.

Another embodiment of the present invention is shown in Fig. 2. The impedance bridge 2, such as that shown in Fig. 1 is connected in a somewhat simplified circuit. A controlled current source 242 has been connected between the input node 10 of the bridge 2 and a terminal 210 of the temperature compensating means 39. The controlled current source 242 maintains the sum of the currents flowing through the legs 4 and 6 of the bridge 2 at a predetermined value. The voltage signal, at the terminal 210 with respect to the common point 38, is fed to a differential amplifier means 241 where the signal is compared with the signal from a reference voltage source 44. The differential amplifier means 241 is connected to and controls the controlled current source 242 thereby regulating the sum of the currents flowing through the legs 4 and 6 of the bridge 2. The temperature compensating means 39 is equivalent to the temperature compensating means 39, of Fig. 1, and functions in the same manner.

The output nodes 48 and 50 of the bridge 2 are connected to an amplifier 274. The amplifier 274 is connected to a transistor 276 through diodes 278. Any output signal across the output nodes 48 and 50 of the bridge 2 results in a flow of current through the transistor 276. The current flowing from a voltage source + V308 through the transistor 276 will cause a voltage drop to occur across the series connected resistors 310, 311 and 330. In order to understand the operation of the circuit more fully, assume that the semiconductor sensing elements 14, 16, 18, and 20 of the bridge 2 are strained causing the output terminal 50 to increase in potential, or become more positive with respect to a common reference, such as, the common point 38. By assuming the appropriate connection of the amplifier 274 to the output nodes 48 and 50, the current flowing in the transistor 276 will increase, resulting in a decrease in the potential at the bus 315. Since the series combination of the resistor 313, the semiconductor sensing elements 20 and 22 and the potentiometer 32 forms a voltage divider, the potential at the output node 50 will decrease resulting in a negative feedback action. A decrease in the current flowing through the leg 6 will therefore result in an increase in the current through the leg 4 due to the action of the controlled current source 242 which holds the sum of the currents flowing through the legs at a predetermined value. The potential at the output node 48 with respect to the common point 38 will thereby increase. The same type of push-pull action between the output nodes 48 and 50 takes place in the circuit of the present embodiment of the invention as in the embodiment of the invention shown in FIG. 1.

The span range, that is, the total change of current output flowing through the transistor 276 to the total change in strain of the bridge 2, is varied by connecting a resistor across the split input nodes 8 and 12. The span range may be varied by switching between the resistors 318 and 320 or by leaving the associated switch 319 open. A fine adjustment of the span is accomplished through adjustment of the slider along the slidewire resistor 310. In actual practice, the number of resistors will be larger than 2 in order to provide a great variation and multiplicity of span ranges. As described above, the feedback system for electrically nulling the bridge 2 acts in a push-pull fashion with respect to the currents flowing through the legs 4 and 6. A resistor, such as the resistor 320, connected between the split input nodes 8 and 12 of the bridge 2 shunts the negative feedback action of the amplifier 274, the transistor 276 and the resistors 310, 311 and 330, thereby reducing the push-pull action. The span of the bridge is readily varied by changing the push-pull effect to the negative feedback around the bridge 2.

A voltage regulator 261 connected to the amplifier 274, the bus 315 and the common point 38 maintains the current flow through the amplifier 274 at a predetermined value.

As in the circuit illustrated in Fig. 1, the circuit shown in Fig. 2 provides that an output current signal will be carried by the power supply leads connected to the positive and negative power supply terminals + and −, respectively. Again, as before, it is anticipated that suitable current responsive utilization means will be connected serially between the power terminals here illustrated and a power source.

The present invention utilizes the constant current impedance bridge with feedback in order to null the electrical unbalance condition produced by the strain on the strain gauge elements. In order to fully utilize the capibilities of a constant current impedance bridge, one of the input nodes of said bridge is split, thereby creating what may be called an open bridge. Because of the logarithmic characterstics of the semiconductor sensing elements in the bridge, a shunting resistor compensation as well as a logarithmic compensation by the thermistors is provided in the output node circuits of the impedance bridge. The initial bridge offset, or zero voltage, is stabilized by the constant current control means and the nulling feedback circuitry associated with the impedance bridge. Span and sensitivity compansation is accomplished by the use of shunting resistors across the bridge which compensate for a tendancy toward an increase in sensitivity as the temperature decreases. In order to recompensate for a possible overcompensation of the shunting resistors, thermistors are connected in the circuitry of the output nodes thereby compensating for nonlinearities in the characteristics of the elements associated with the shunting resistors. In the second embodiment of the invention, the open bridge is modified by including a series of resistors for changing the span ranges to be connected between the terminals of the split node. In the second embodiment of the invention the transmitting circuit also forms part of the constant current feedback loop.

The embodiments of the invention in which an exclusive property or privilege is claimed are defined as follows:

1. An impedance bridge circuit having
   a first leg including a first and second serially connected condition responsive arm;
   a second leg including a first and second serially connected condition responsive arm;
   said bridge having input means and output means including input terminals, and output terminals, respectively;
   current control means connected to said input terminals for controlling the flow of electric current through said bridge legs;
   current sensing means for sensing the sum of currents flowing in said first and second legs;

said current control means including current regulating means responsive to said current sensing means for maintaining the sum of said currents at a predetermined level; and means for concurrently controlling the current flow through each of said legs individually; and output means connected to said output terminals of said bridge.

2. The invention as set forth in Claim 1 wherein said current sensing means includes a resistor connected in series between an input terminal of said bridge and a point of reference potential, said current sensing means further including temperature responsive means connected in shunt with said resistor whereby to compensate said bridge for thermally induced changes.

3. The invention as set forth in Claim 1 wherein said means for controlling the current flow through each of said legs individually includes feedback means connected between said output means and an input terminal of at least one of said legs.

4. The invention as set forth in Claim 1 wherein said input terminals of said bridge includes one input terminal common to both of said legs at one end thereof and a pair of input terminals individual to each of said legs at the other ends thereof, said means for controlling the current flow through each of said legs individually being connected to said pair of input terminals and said output means.

5. The invention as set forth in Claim 4 and including further temperature compensating means in each of said legs to compensate said bridge for thermally induced zero shift.

6. The invention as set forth in Claim 4 wherein said output means includes a transistor amplifier connected to control the amount of current flowing in a pair of transmission lines, which transmission lines carry all of the electrical energy for energizing said impedance bridge circuit, said current in said transmission lines being a function of the condition sensed by said condition responsive arms of said bridge.

7. The invention as set forth in Claim 6 wherein said condition responsive arms comprise strain sensitive semiconductor resistance elements.

* * * * *